United States Patent
Loupos et al.

(10) Patent No.: US 11,134,383 B2
(45) Date of Patent: Sep. 28, 2021

(54) OFFLOADED SENSOR AUTHENTICATION FOR INTERNET OF THINGS

(71) Applicant: Inlecom Systems, London (GB)

(72) Inventors: Konstantinos Loupos, Athens (GR); Gerasimos Kouloumpis, London (GB); Alexander Papageorgiou, Athens (GR); Takis Katsoulakos, W. Sussex (GB); Patrick J. O'Sullivan, Dublin (IE)

(73) Assignee: INLECOM SYSTEMS LIMITED, London (GB)

( * ) Notice: Subject to any disclaimer, the term of this patent is extended or adjusted under 35 U.S.C. 154(b) by 0 days.

(21) Appl. No.: 16/588,961

(22) Filed: Sep. 30, 2019

(65) Prior Publication Data

US 2021/0099875 A1    Apr. 1, 2021

(51) Int. Cl.
*H04W 12/069* (2021.01)
*H04W 88/16* (2009.01)
*H04L 9/06* (2006.01)
*H04L 29/06* (2006.01)

(52) U.S. Cl.
CPC ......... *H04W 12/069* (2021.01); *H04L 9/0637* (2013.01); *H04L 9/0643* (2013.01); *H04L 63/0892* (2013.01); *H04W 88/16* (2013.01); *H04L 2209/38* (2013.01)

(58) Field of Classification Search
CPC .......................... H04W 12/0609; H04W 88/16; H04L 9/0637; H04L 9/0643; H04L 63/0892
See application file for complete search history.

(56) References Cited

U.S. PATENT DOCUMENTS

| | | | |
|---|---|---|---|
| 2009/0328225 A1* | 12/2009 | Chambers | G06F 21/44 726/26 |
| 2018/0183587 A1* | 6/2018 | Won | H04L 9/0891 |
| 2019/0158461 A1 | 5/2019 | Walker et al. | |
| 2020/0366468 A1* | 11/2020 | Khandani | H04L 69/161 |
| 2020/0382502 A1* | 12/2020 | Cheng | H04L 63/0892 |

OTHER PUBLICATIONS

U.S. Appl. No. 62/854,967 Dated May 30, 2019 (Year: 2019).*
Ayoade Gbadebo, et al., Secure Data Processing for IoT Middleware Systems, Jounal of Supercomputing, Dordrecht, NL , vol. 78, No. 8, Nov. 2018.

* cited by examiner

*Primary Examiner* — Jeffrey M Rutkowski
*Assistant Examiner* — Basil Ma
(74) *Attorney, Agent, or Firm* — Steven M. Greenberg, Esq.; Shutts & Bowen LLP

(57) ABSTRACT

An IoT sensor authentication method includes receiving in an IoT gateway or another IoT sensor, a packet of data from a sensor over a wireless computer communications network, placing the packet of data into quarantine in memory of the IoT gateway and offloading authentication of the sensor to an authentication processor executing in a separate process address space in the IoT gateway. Thereafter, an authentication result is received from the authentication processor and, responsive to the authentication result indicating successfully authentication of the sensor, the packet is released from quarantine, a sensor value extracted from the packet of data and the sensor value transmitted to a sensor monitor. But, responsive to the authentication result indicating a failure to authenticate the sensor, the packet of data is discarded and removed from quarantine.

16 Claims, 2 Drawing Sheets

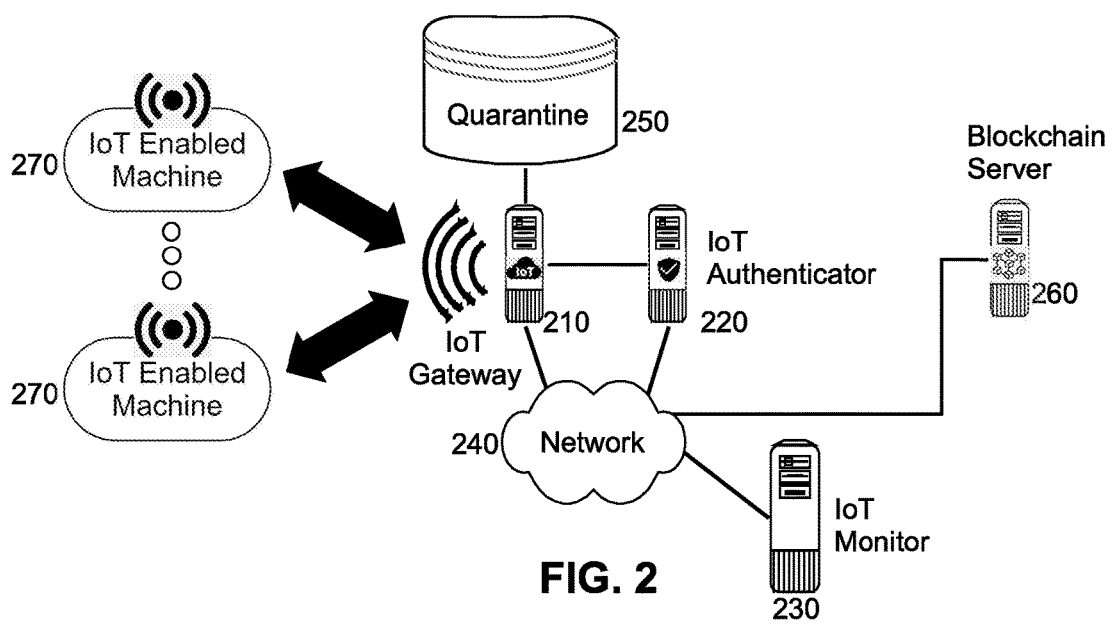
FIG. 2
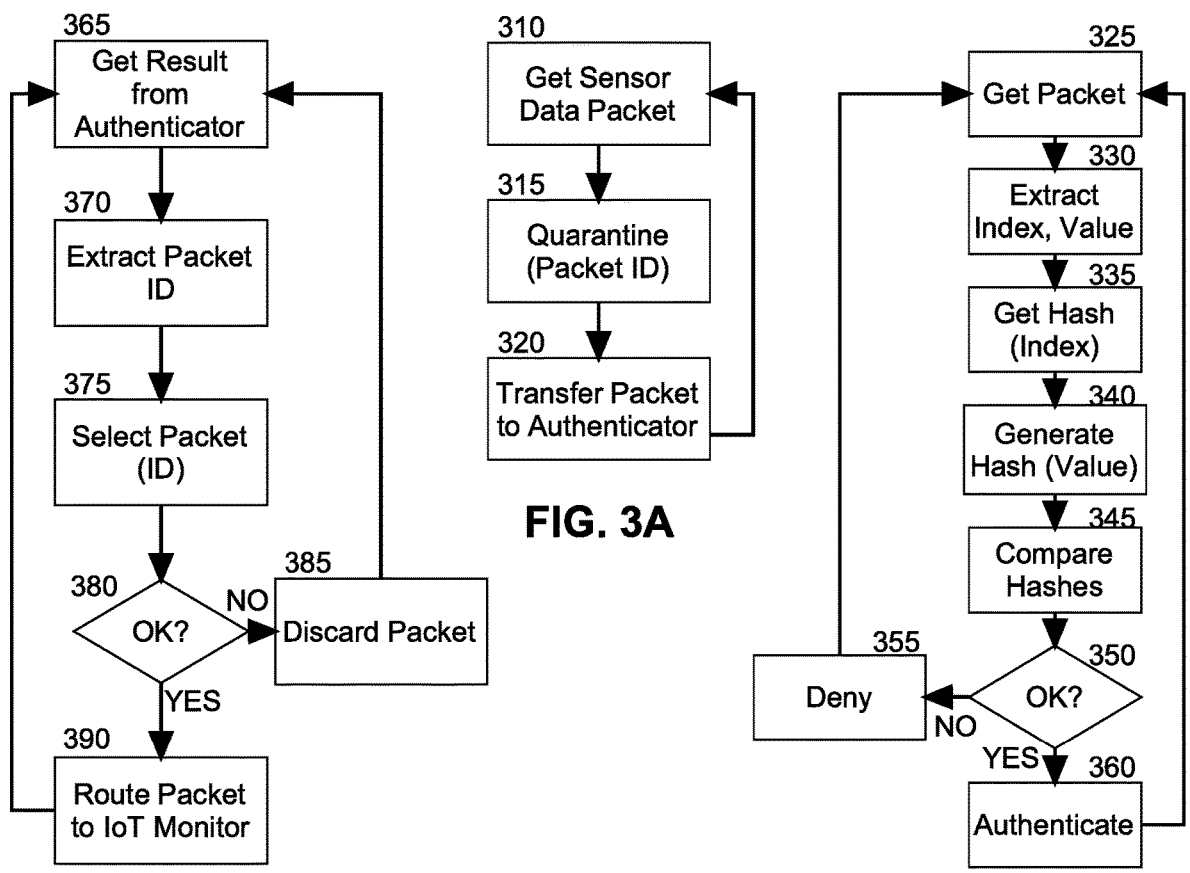

OFFLOADED SENSOR AUTHENTICATION FOR INTERNET OF THINGS

BACKGROUND OF THE INVENTION

Field of the Invention

The present invention relates to the field of Internet of Things (IoT) and more particular to the management of data received from different IoT sensors.

Description of the Related Art

IoT refers to a vast web of connected devices over the global Internet by way of the instrumentation of ordinary machines ranging from toasters to automobiles. Literally, anything that can be powered on or off, once instrumented for IoT permits one-way or two-way interactions over the Internet. These interactions can range from merely reporting a status of a sensor, for instance an ordinary value, to receiving directives effectively remotely operating an IoT enabled device. While the advantages of IoT enabling a machine are substantial, those advantages come at a cost—the creation of a security vulnerability in the machine.

In this regard, as a stand-alone unit, a stand-alone device or machine including a sensor is impervious to remote threats by and large. But, just like any other connected personal computer, a device or machine configured for IoT becomes vulnerable to remote threats including network intrusions. As well, to the extent that the communications path between an IoT enabled machine, device or sensor, and an IoT gateway becomes accessible by a malevolent actor, the malevolent actor may spoof the identity of the IoT enabled machine so as to report false values to the IoT gateway as if the values were correctly reported by the IoT enabled machine—the so-called man in the middle attack. Password protection provides only limited relief from a man-in-the-middle attack in so far as the processing of a password for every value received from every coupled IoT enabled machine in an IoT gateway can be substantially resource intensive so as to allow for a denial of service (DoS) style attack upon the IoT gateway.

BRIEF SUMMARY OF THE INVENTION

Embodiments of the present invention address deficiencies of the art in respect to IoT sensor management and provide a novel and non-obvious method, system and computer program product for IoT sensor authentication. In an embodiment of the invention, an IoT sensor authentication method includes receiving in an IoT computing device such as an IoT gateway or another IoT sensor, a packet of data from a sensor over a wireless computer communications network, placing the packet of data into quarantine in memory of the IoT computing device and offloading authentication of the sensor to an authentication processor executing in a separate process address space than the process receiving the packet in the IoT computing device. Thereafter, an authentication result is received from the authentication processor and, responsive to the authentication result indicating successfully authentication of the sensor, the packet is released from quarantine, a sensor value extracted from the packet of data and the sensor value transmitted to a sensor monitor. But, responsive to the authentication result indicating a failure to authenticate the sensor, the packet of data is discarded and removed from quarantine.

Of note, whereas the embodiments below primarily refer to the IoT computing device as an IoT gateway wirelessly coupled to a multiplicity of different IoT sensors, optionally, in a peer-to-peer arrangement, the packet of data may be received from one IoT sensor by a different IoT sensor and authenticated in the authentication process separate from the different IoT sensor and then, upon authentication, passed to the IoT monitor, or even to a downstream IoT gateway. In either circumstance, in one aspect of the embodiment, the authentication processor authenticates the sensor by extracting a shared secret from the packet of data, comparing the shared secret with a pre-stored secret for the sensor and authenticating the sensor if the shared secret matches the pre-stored secret. But, in the alternative case authentication of the sensor fails. In another aspect of the embodiment, the authentication processor authenticates the sensor by extracting a hash value from the packet of data, retrieving a pre-stored hash key for the sensor, computing a hash of the sensor value using the pre-stored hash key and comparing the computed hash with the extracted hash value and authenticating the sensor if the computed hash matches the extracted hash value. But otherwise authentication of the sensor fails.

In yet another aspect of the embodiment, the authentication processor authenticates the sensor by extracting from the packet of data both a value identifying the sensor and an index into a block of a blockchain, retrieving from the block at the index, a pre-stored value for the sensor, comparing the pre-stored value with the extracted value and authenticating the sensor if the pre-stored value matches the extracted value, but otherwise failing authentication of the sensor. In even yet another embodiment of the invention, an IoT sensor gateway is configured to authenticate different sensors coupled to thereto.

The system includes a host computing system that has one or more computing devices, each with memory and at least one processor, and coupled to a multiplicity of IoT configured sensors. The system also includes a sensor authentication module that includes computer program instructions executing in the memory of the host computing system. The program instructions during execution receive a packet of data from one of the sensors over a computer communications network, place the packet of data into quarantine in the memory of the host computing system, offload authentication of the sensor to an authentication processor executing in a separate process address space in the host computing system, receive an authentication result from the authentication processor and, in response to the authentication result indicating successfully authentication of the sensor, release the packet from quarantine, extract a sensor value from the packet of data and transmit the sensor value to a sensor monitor. But, responsive to the authentication result indicating a failure to authenticate the sensor, the program instructions discard the packet of data and remove the packet of data from quarantine.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 2 is a schematic illustration of an IoT data processing system configured for IoT sensor authentication; and, FIGS. 3A through 3B, taken together, are a flow chart illustrating a process for IoT sensor authentication.

DETAILED DESCRIPTION OF THE INVENTION

Figure 1:
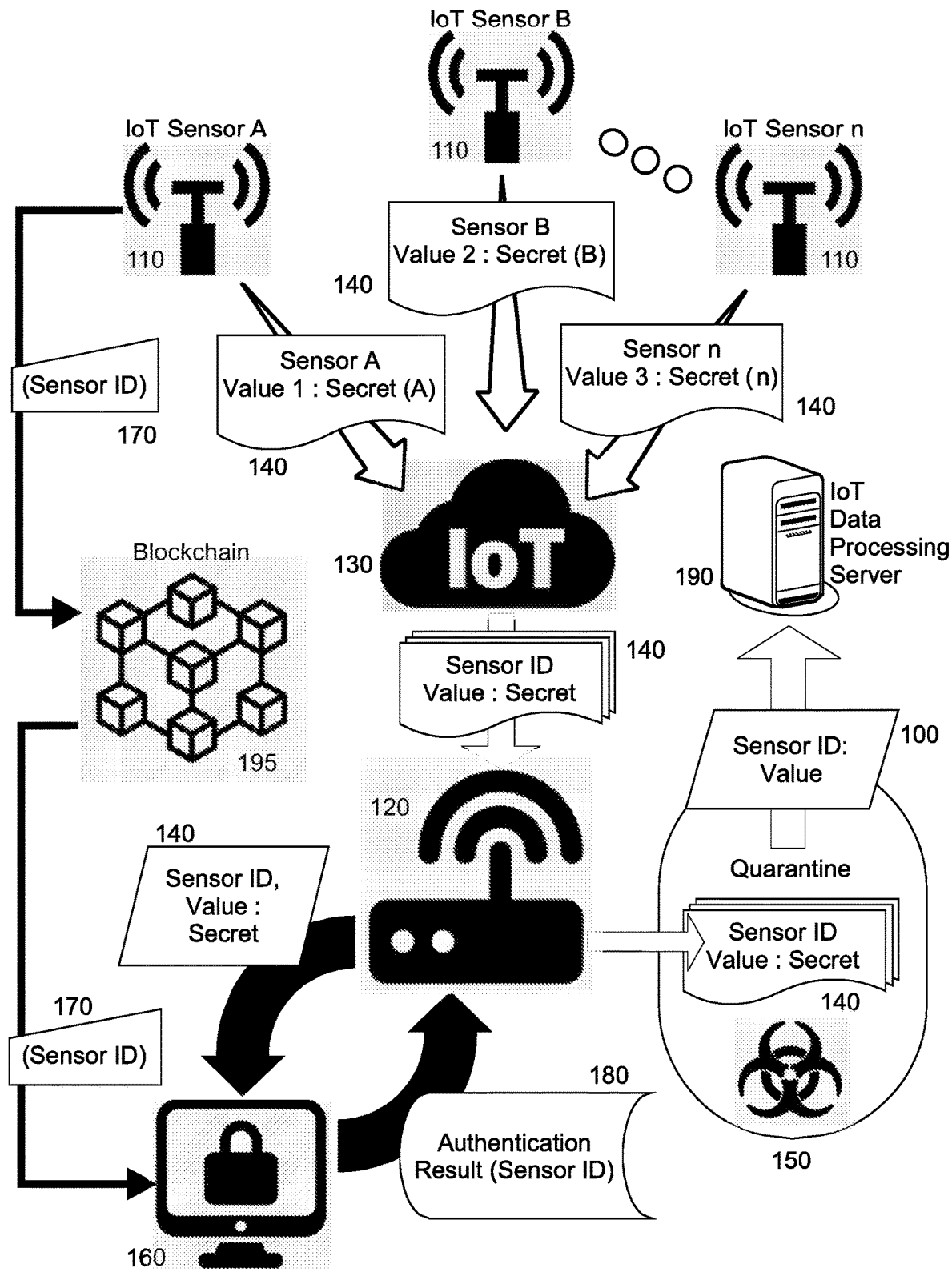
FIG. 1 is pictorial illustration of a process for IoT sensor authentication.

Embodiments of the invention provide for IoT sensor authentication. In accordance with an embodiment of the invention, different IoT sensors report different sensed values within corresponding data packets over an IoT network to an IoT monitor by way of an IoT gateway. Each of the data packets includes not only a reported one of the values for a corresponding IoT sensor, but also a shared secret. In this regard, the shared secret can range from a symmetric encryption key to an index into a data store, for example a block chain and a corresponding value stored in the data store Upon receipt of a data packet from a corresponding one of the IoT sensors, the IoT gateway quarantines the data packet and offloads authentication of the corresponding IoT sensor to an authentication process that is separate from the IoT gateway. Only upon receiving a confirmation of authentication of the corresponding IoT sensor from the authentication process will the IoT gateway release from quarantine the data packet and route the encapsulated reported value to the IoT monitor. In this way, the authenticity of each received value can be confirmed so as to avoid a man-in-the-middle attack without overburdening the IoT gateway with the processing overhead of IoT sensor authentication.

In further illustration, FIG. 1 pictorial shows a process for IoT sensor authentication. As shown in FIG. 1, multiple different IoT sensors 110 communicate data packets 140 over wireless IoT network 130 to an IoT gateway 120. Each of the data packets 140 includes not only a sensed value that had been sensed by a corresponding one of the IoT sensors 110, but also a shared secret and an identification of the corresponding one of the IoT sensors 110. The IoT gateway 120, upon receiving each one of the data packets 140, places each one of the data packets 140 into a quarantine 150. Concurrently, the IoT gateway 120 provides the data packet 140 to an authentication processor 160 executing separately from the IoT gateway in its own process address space, and optionally, in a completely separate host computing system.

The authentication processor 160 upon receiving the data packet 140, extracts therefrom the both the identifier of the corresponding one of the IoT sensors 110, and the encapsulated secret. The authentication processor 160 then processes the secret to determine whether or not the source of the data packet 140 is the corresponding one of the IoT sensors 110. The authentication processor 160 may perform the authentication according to a simple matching of decryption of the shared secret utilizing a symmetric encryption key known to be associated with the corresponding one of the IoT sensors 110 and used by the corresponding one of the IoT sensors 110 to encrypt the shared secret. More complicated modes of authentication may also be performed in the authentication processor 160, however, including decrypting of the shared secret that had been encrypted with a private key of an asymmetric public-private key pair of the corresponding one of the IoT sensors 110, utilizing the public key published for the corresponding one of the IoT sensors 110.

Optionally, the authentication processor 160 processes the secret by determining from the secret both a value 170 identifying the corresponding one of the IoT sensors 110, and an index into a block 195 of a blockchain at which the value 170 identifying the corresponding one of the IoT sensors 110 is stored by the corresponding one of the IoT sensors 110. The authentication processor 160 then retrieves the value 170 from block 195 and compares the value 170 of the secret to the value 170 retrieved from the block 195. To the extent both values 170 match, the authentication processor 160 returns a favorable authentication result 180 for the corresponding one of the IoT sensors 110.

The IoT gateway 120, upon receiving an authentication result 180 from the authentication processor for a corresponding one of the IoT sensors 110 and an associated received one of the data packets 140, determines of the authentication result 180 serves to authenticate the corresponding one of the IoT sensors 110 as the source of the data packet 140. If not, the IoT gateway 120 discards the data packet 140 from the quarantine 150 without forwarding the data packet 140 to the IoT monitor 190. But, if the authentication result 180 confirms the authenticity of the data packet 140 as having been received from the corresponding one of the IoT sensors 110, the IoT gateway 120 directs the release from the quarantine 150 of the data packet 140 and provides to the IoT monitor 190 value data 100 including the value of the data packet and an identifier of the corresponding one of the IoT sensors 110.

The process described in connection with FIG. 1 may be implemented in an IoT data processing system. In further illustration, FIG. 2 schematically shows an IoT data processing system configured for IoT sensor authentication. The system includes an IoT gateway 210, wirelessly communicatively coupled to a multiplicity of different IoT enabled machines 270. Each of the IoT enabled machines 270 transmits data packets to the IoT gateway 210, the data packets encapsulating each of an identifier of the corresponding one of the IoT enabled machines 270, a value sensed in the corresponding one of the IoT enabled machines 270, and a shared secret.

The IoT gateway 210 is a process executing in a host computing device (or multiple different host computing devices) and is communicatively coupled over wire bound network 240 to an IoT monitor 230. The IoT gateway 210 serves as a collection point for data packets wirelessly received from the IoT enabled machines 270 and as a distributor of the sensed values within the data packets to the IoT monitor 230. The IoT monitor 230, in turn, is a process executing in memory of a host computer (or set of host computers) that is adapted to receive sensed values from the IoT enabled machines 270 by way of the IoT gateway 210, and to process the sensed values in connection with corresponding ones of the IoT enabled machines 270. The processing performed by the IoT monitor 230 ranges from merely displaying the sensed values in association with corresponding ones of the IoT enabled machines 270, to performing computations upon the sensed values for display in terms of trending values, predicted values or values which are determined to exceed or fall short of a threshold indicative of an anomalous condition.

Importantly, the IoT gateway 210 also is communicatively coupled to an IoT authenticator 220 and to a quarantine data store 250. The IoT authenticator 220 is a process adapted to authenticate received data packets from respective ones of the IoT enabled machines 270 as having been authentically transmitted by the respective ones of the IoT enabled machines 270 to the IoT gateway 210. The IoT authenticator 220 as a process may execute within the same computing device as the IoT gateway 210, or in a separate computing device as shown herein. But, in all circumstances, the IoT authenticator 220 executes in a process address space that is different than that of the IoT gateway 210.

In operation, the IoT gateway 210 receives a data packet from a corresponding one of the IoT enabled machines 270 and places the data packet into the quarantine data store 250. The IoT gateway 210 then provides either the complete data packet to the IoT authenticator 220, or the IoT gateway 210 extracts from the data packet an identifier for the corresponding one of the IoT enabled machines 270, and a shared secret. The shared secret can be an encrypted value encrypted with a symmetric key known both to the corresponding one of the IoT enabled machines 270 and the IoT authenticator 220. Alternatively, the shared secret can be an encrypted value encrypted with an asymmetric key known only to the corresponding one of the IoT enabled machines 270, such that the shared secret can be decrypted using a public key of the corresponding one of the IoT enabled machines 270 known to the IoT authenticator 220. In either circumstance, the IoT authenticator 220 is enabled to authenticate the source of a data packet when the shared secret is confirmed in the IoT authenticator 220.

As yet another option for authentication, in lieu of the mere decryption of a shared secret within the data packet, the shared secret may be an index into a block of a blockchain. Upon receipt of the shared secret, the IoT authenticator 220 may then access the block in the blockchain by way of a blockchain server 260 and to retrieve therefrom, a hash of the value encapsulated within the data packet. The IoT authenticator 220 then may compute a hash of the encapsulated value and compare the same to the hash retrieved from the block in the blockchain. In this way, the value encapsulated within the data packet can be assured as to having not been modified from the time the hash is entered into the block of the blockchain to the time the hash is retrieved by the IoT authenticator 220 from the block of the blockchain.

No matter the mode of authentication performed by the IoT authenticator 220, ultimately, the IoT authenticator 220 provides an authentication result to the IoT gateway 210 in respect to a received data packet associated with a particular one of the IoT enabled machines 270. Upon receipt of the authentication result for the received data packet, the IoT gateway 210 determines if the sensed value within the data packet authentically had been provided by the particular one of the IoT enabled machines 270. If not, the data packet is discarded from quarantine data store 250 without permitting the routing of the data packet or any values encapsulated therein to the IoT monitor 230. In contrast, if the IoT gateway 210 determines that the sensed value within the data packet authentically had been provided by the particular one of the IoT enabled machines 270, the IoT gateway 210 routes the data packet to the IoT monitor for further processing.

In even yet further illustration of the operation of the IoT gateway 210 and the IoT authenticator 220, FIGS. 3A through 3B, taken together, are a flow chart illustrating a process for IoT sensor authentication. Beginning first in FIG. 3A, in block 310 a data packet is received from a corresponding one of the IoT enabled machines. In block 315, the data packet is placed in quarantine in association with a packet identifier. Then, in block 320, the data packet is transferred to the IoT authenticator so as to offload the resource intensive burden of performing authentication upon the data packet. Finally, the process returns to block 310 in the receipt of a next data packet.

Turning now to FIG. 3B, in block 325, the data packet is received in the IoT authenticator from the IoT gateway. In block 330, an index into a block of a blockchain is extracted from the data packet along with a sensed value. In block 335, a hash for the value is retrieved from the block on the blockchain at the index and in block 340, a hash is computed for the value utilizing a hash function common to the corresponding one of the IoT enabled machines. In block 345, the retrieved hash and the computed hash are compared. In decision block 350, if the retrieved hash and computed hash differ, then in block 355 the IoT authenticator returns an authentication result to the IoT gateway in respect to the packet identifier indicating a failure to authenticate. Otherwise, if the retrieved hash and the computed hash do not differ, then in block 360 the IoT authenticator returns an authentication result to the IoT gateway in connection with the packet identifier indicating a successful authentication.

Turning now to FIG. 3C, in block 365, the IoT gateway receives the authentication result from the IoT authenticator. In block 370, a packet identifier is retrieved from the authentication result and in block 375, a data packet stored in the quarantine associated with the packet identifier is selected for processing. In decision block 380 it is determined if the authentication result indicates successful authentication. If not, in block 385 the selected data packet is discarded from the quarantine without further routing to the IoT monitor. However, if in decision block 380 it is determined that the authentication result indicates successful authentication, in block 390 the selected data packet is discarded from quarantine and routed to the IoT monitor for further processing.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. An Internet of Things (IoT) sensor authentication method comprising:
   receiving a packet of data in an IoT gateway computing device from a sensor amongst multiple different IoT sensors, each of the different IoT sensors communicating data packets over a wireless computer communications network to the IoT gateway computing device, each of the data packets including not only a sensed value that had been sensed by a corresponding one of the IoT sensors, but also a shared secret and an identification of a corresponding one of the IoT sensors;
   placing the packet of data into quarantine in memory of the IoT computing device;
   offloading authentication of the sensor by the IoT gateway computing device to an authentication processor executing in a separate process address space than a process in the IoT gateway computing device receiving the packet of data in the IoT computing device;
   wherein the authentication processor authenticates the sensor by;
   extracting a shared secret from the packet of data;
   comparing the shared secret with a pre-stored secret for the sensor; and,
   authenticating the sensor if the shared secret matches the re-stored secret, but otherwise failing authentication of the sensor;
   receiving an authentication result from the authentication processor; and,
   responsive to the authentication result indicating successfully authentication of the sensor, releasing the packet from quarantine, extracting a sensor value from the packet of data and transmitting the sensor value to a sensor monitor, but responsive to the authentication result indicating a failure to authenticate the sensor, discarding the packet of data and removing the packet of data from quarantine.

2. The method of claim 1, wherein the authentication processor authenticates the sensor by:
   extracting a hash value from the packet of data;
   retrieving a pre-stored hash key for the sensor;
   computing a hash of the sensor value using the pre-stored hash key and comparing the computed hash with the extracted hash value; and,
   authenticating the sensor if the computed hash matches the extracted hash value, but otherwise failing authentication of the sensor.

3. The method of claim 1, wherein the authentication processor authenticates the sensor by:
   extracting from the packet of data both a value identifying the sensor and an index into a block of a blockchain;
   retrieving from the block at the index, a pre-stored value for the sensor;

comparing the value identifying the sensor with the extracted value; and, authenticating the sensor if the values match, but otherwise failing authentication of the sensor.

4. The method of claim 1, wherein the IoT computing device is an IoT gateway.

5. The method of claim 4, wherein the IoT gateway comprises multiple different computing devices, each with memory and at least one processor, wherein the separate process address space executes in a different one of the computing devices than a process address space from which the authentication had been offloaded.

6. The method of claim 1, wherein the IoT computing device is another sensor.

7. An Internet of Things (IoT) sensor gateway configured to authenticate different sensors coupled to thereto, the system comprising:

a host computing system comprising one or more computing devices, each with memory and at least one processor, and wirelessly coupled to a multiplicity of IoT configured sensors; and, a sensor authentication module comprising computer program instructions executing in the memory of the host computing system, the program instructions performing:

receiving a packet of data in an IoT gateway computing device from a sensor amongst multiple different IoT sensors, each of the different IoT sensors communicating data packets over a wireless computer communications network to the Iot gateway computing device, each of the data packets including not only a sensed value that had been sensed by a corresponding one of the IoT sensors, but also a shared secret and an identification of a corresponding one of the IoT sensors;

placing the packet of data into quarantine in the memory of the host computing system;

offloading authentication of the sensor by the IoT gateway computing device to an authentication processor executing in a separate process address space than a process in the IoT gateway computing device receiving the packet of data in the IoT computing device;

wherein the authentication processor authenticates the one of the sensors by:

extracting a shared secret from the packet of data;

comparing the shared secret with a pre-stored secret for the one of the sensors; and, authenticating the sensor if the shared secret matches the ore-stored secret, but otherwise failing authentication of the one of the sensors;

receiving an authentication result from the authentication processor; and, responsive to the authentication result indicating successfully authentication of the sensor, releasing the packet from quarantine, extracting a sensor value from the packet of data and transmitting the sensor value to a sensor monitor, but responsive to the authentication result indicating a failure to authenticate the sensor, discarding the packet of data and removing the packet of data from quarantine.

8. The system of claim 7, wherein the authentication processor authenticates the one of the sensors by:

extracting a hash value from the packet of data;

retrieving a pre-stored hash key for the one of the sensors;

computing a hash of the sensor value using the pre-stored hash key and comparing the computed hash with the extracted hash value; and, authenticating the sensor if the computed hash matches the extracted hash value, but otherwise failing authentication of the one of the sensors.

9. The system of claim 7, wherein the authentication processor authenticates the one of the sensors by:

extracting from the packet of data both a value identifying the sensor and an index into a block of a blockchain;

retrieving from the block at the index, a pre-stored value for the sensor;

comparing the values; and, authenticating the sensor if the pre-stored value for the sensor matches the extracted value, but otherwise failing authentication of the sensor.

10. The system of claim 7, wherein the separate process address space executes in a different one of the computing devices than a process address space from which the authentication had been offloaded.

11. A computer program product for Internet of Things (IoT) sensor authentication, the computer program product including a non-transitory computer readable storage medium having program instructions embodied therewith, the program instructions executable by a device to cause the device to perform a method including: receiving a packet of data in an IoT gateway computing device from a sensor amongst multiple different IoT sensors, each of the different IoT sensors communicating data packets over a wireless computer communications network to the IoT gateway computing device, each of the data packets including not only a sensed value that had been sensed by a corresponding one of the IoT sensors, but also a shared secret and an identification of a corresponding one of the IoT sensors;

placing the packet of data into quarantine in memory of the IoT computing device;

offloading authentication of the sensor by the IoT gateway computing device to an authentication processor executing in a separate process address space than a process in the IoT gateway computing device receiving the packet of data in the IoT computing device;

wherein the authentication processor authenticates the sensor by:

extracting a shared secret from the packet of data;

comparing the shared secret with a pre-stored secret for the sensor; and, authenticating the sensor if the shared secret matches the pre-stored secret, but otherwise failing authentication of the sensor;

receiving an authentication result from the authentication processor; and, responsive to the authentication result indicating successfully authentication of the sensor, releasing the packet from quarantine, extracting a sensor value from the packet of data and transmitting the sensor value to a sensor monitor, but responsive to the authentication result indicating a failure to authenticate the sensor, discarding the packet of data and removing the packet of data from quarantine.

12. The computer program product of claim 11, wherein the authentication processor authenticates the sensor by:

extracting a hash value from the packet of data;

retrieving a pre-stored hash key for the sensor;

computing a hash of the sensor value using the pre-stored hash key and comparing the computed hash with the extracted hash value; and, authenticating the sensor if the computed hash matches the extracted hash value, but otherwise failing authentication of the sensor.

13. The computer program product of claim 11, wherein the authentication processor authenticates the sensor by:
    extracting from the packet of data both a value identifying the sensor and an index into a block of a blockchain;
    retrieving from the block at the index, a pre-stored value for the sensor;
    comparing the pre-stored value with the extracted value; and,
    authenticating the sensor if the pre-stored value matches the extracted value, but otherwise failing authentication of the sensor.

14. The computer program product of claim 11, wherein the IoT computing device is an IoT gateway.

15. The computer program product of claim 14, wherein the IoT gateway comprises multiple different computing devices, each with memory and at least one processor, wherein the separate process address space executes in a different one of the computing devices than a process address space from which the authentication had been offloaded.

16. The computer program product of claim 11, wherein the IoT computing device is another sensor.

\* \* \* \* \*